United States Patent [19]
Ortony

[11] Patent Number: 6,038,595
[45] Date of Patent: Mar. 14, 2000

[54] INFORMATION/COMMUNICATION DEVICE FOR NETWORK BASED SERVICES AND A SYSTEM FOR USE OF INFORMATION/COMMUNICATION BASED SERVICES

[75] Inventor: Felix Sebastian Ortony, Westboro, Mass.

[73] Assignee: EMC Corporation, Hopkinton, Mass.

[21] Appl. No.: 09/033,227

[22] Filed: Mar. 2, 1998

[51] Int. Cl.[7] ................................................. G06F 13/00
[52] U.S. Cl. ......................... 709/218; 709/203; 709/227
[58] Field of Search .................................. 455/5.1, 34.1;
345/339, 327; 348/6; 380/25; 705/34; 370/349,
338, 352; 709/2, 218, 200, 229, 203, 227,
246; 395/200, 186; 707/513

[56] References Cited

U.S. PATENT DOCUMENTS

| 5,608,446 | 3/1997 | Carr et al. ................................ 348/6 |
| 5,625,877 | 4/1997 | Dunn et al. ............................. 455/34.1 |
| 5,726,984 | 3/1998 | Kubler et al. ............................ 370/349 |
| 5,732,216 | 3/1998 | Logan et al. ............................. 707/513 |
| 5,732,219 | 3/1998 | Blumer et al. ........................... 709/227 |
| 5,745,884 | 4/1998 | Carnegie et al. .......................... 705/34 |
| 5,761,683 | 6/1998 | Logan et al. ............................. 707/513 |
| 5,781,909 | 7/1998 | Logan et al. ............................. 709/200 |
| 5,793,966 | 8/1998 | Amstein et al. .......................... 709/203 |
| 5,802,299 | 9/1998 | Logan et al. ............................. 709/246 |
| 5,809,145 | 9/1998 | Slik et al. .................................. 380/25 |
| 5,812,131 | 9/1998 | Bertram .................................. 345/339 |
| 5,812,930 | 9/1998 | Zavrel ..................................... 455/5.1 |
| 5,848,064 | 12/1998 | Cowan .................................... 370/338 |
| 5,867,494 | 2/1999 | Krishnaswamy et al. ............... 370/352 |
| 5,867,495 | 2/1999 | Elliott et al. ............................. 370/352 |
| 5,889,942 | 3/1999 | Orenshteyn ............................. 709/229 |
| 5,892,900 | 4/1999 | Ginter et al. ............................ 395/186 |
| 5,944,784 | 8/1999 | Simonoff et al. ........................ 709/218 |
| 5,956,024 | 9/1999 | Strickland ............................... 345/327 |

Primary Examiner—Frank J. Asta
Assistant Examiner—Thong Vu
Attorney, Agent, or Firm—Gary D. Clapp, Esq.

[57] ABSTRACT

A network service device and a system or computer system for providing network based services in an area defined by a wireless local area network. The system includes a local area server having at least one network link to at least one network server and supporting a local area wireless network communicating with one or more network service devices wherein a network service device is tailored to provide specific network based services. Each network service device includes a processor and a program memory and a transceiver for local area communications of data between a network services device and the local area server. A local area server includes a processor and a program memory for executing local area server programs, a transceiver for providing local area communications and a modem connected to the network and at least one network server. The network services device may a personal device to provide network based services to a user and may includes user input/output devices while the source of network services may be internet servers.

9 Claims, 3 Drawing Sheets

INFORMATION/COMMUNICATION DEVICE FOR NETWORK BASED SERVICES AND A SYSTEM FOR USE OF INFORMATION/ COMMUNICATION BASED SERVICES

FIELD OF THE INVENTION

The present invention relates to a system and devices for providing network information access and communication services and, more particularly, for providing internet related services such as web access and electronic mail services and the integration of services and functions through the internet.

BACKGROUND OF THE INVENTION

One of the most significant trends in industry and business in recent years has been the advent and increased availability and use of personal and portable devices for communications and for access to information and the integration of services and functions through networks. This trend began with personal desktop computers and facsimile machines, which gave individual users personal and individual access to the data generation and manipulation powers of computers and the ability to send and receive data and images with the same ease as voice communications. The trend continued with cellular telephones and laptop and notebook computers which, by being personal and readily portable and serviced by wide area radio networks, freed the users from geographic constraints, such as the desktop. At this time, for example, individuals may be found making use of notebook computers and cellular telephones in literally any location that an individual can go, from the office to the home or car and even on remote backpacking trails.

A parallel and more recent trend, however, has been the use of electronic mail and the internet, in particular the World Wide Web, for communication and as a readily available and wide ranging information source, so that the primary day to day business or professional environment of many individuals is the internet. That is, for many individuals electronic mail and the Web have replaced the telephone and the personal or notebook computer, and the computer and the telephone system are primarily used as web and electronic mail devices rather than for their original functions. In addition, many services and functions that were formerly provided on a stand-alone basis by separate systems or through dedicated networks have been replaced by systems operating through the internet.

Individuals and systems using, for example, the information and communication facilities of the internet, however, have not been able to take advantage of the portability and lack of locational restriction offered by users of cellular telephones and laptop or notebook computers for a number of reasons, most particularly the need for a direct, physical connection to a telephone or cable line of some form. The user of electronic mail and the Web, for example, has thereby been tied to the desktop, or at least to locations within a few feet of a telephone jack. Also, many potential users of electronic mail and, in particular, the Web, have been inhibited from taking advantage of these resources because of the complexity of the devices for making use of electronic mail and the Web. That is, in order to use electronic mail or the Web, it is necessary for a user to have and to learn to use a general purpose computer and then to learn to use a number of complex specialized electronic mail and Web browser programs, as well as the necessary additional devices, such as modems.

The present invention provides a solution to these and other problems of the prior art.

SUMMARY OF THE INVENTION

The present invention is directed to a network service device for use in association with a system for providing network based services and to a system for providing network based services. The system includes a local area server having at least one network link to at least one network server and supporting a local area wireless network communicating with one or more network service devices wherein a network service device is tailored to provide specific network based services.

According to the present invention, each network service device includes a processor and a memory for executing network service device programs, a network services device transceiver for providing wireless local area communications between the network services device and the local area server, wherein the local area communications including transmission of representations of data from a network services device to the local area server and representations of other data from the local area server to the network services device, and a memory for storing the network services device programs including a device communications program for controlling operation of the network services device transceiver and at least one network services device program for controlling the network services device for performing a network based service.

Also according to the present invention, a local area server includes a processor and a memory for executing local area server programs, a local area server transceiver for providing the wireless between the local area server and a network services device, a modem connected to the network link for communications between the local area server and the at least one network server, and a memory for storing local area programs including a transceiver control program for controlling the local area communications and at least one network communications program for controlling communications between the local area server and the at least one network server.

In one implementation of the present invention, the network services device is a personal device for use by a user to provide network based services to the user and includes a user output device, which may be, for example, a liquid crystal display or an audio output device. The personal network services devices may also include a user input device, such as a keyboard or a set of dedicated control keys tailored specifically to the internet based services provided by the personal device or a user input/output device such as a touch screen liquid crystal display.

In further embodiments of the invention, the network services device transceiver is programmable for transmitting and receiving the local area communications on a selectable one of a plurality of channels and may be self controlled for selecting a currently unused one of a plurality of channels for transmitting and receiving the local area communications.

In a presently preferred embodiment of the invention, the network services are provided by an internet connection and the network services device may include an internet address memory for storing a pre-selected set of addresses of network servers, and a control input for selecting a one of the pre-selected set of addresses of network servers. In one embodiment, the control input for selecting a one of the pre-selected set of addresses of network servers includes a mechanically analog device for generating an analog voltage representing a pre-selected address of an internet server and an analog to digital code converter for converting the analog voltage representing a pre-selected address of an internet server into an address of a pre-selected address of an internet server in the internet address memory.

In a still further embodiment of the invention, the network services device may include an encryption device for encrypting the local area communication between the network services device and a local area server with which the network services device is authorized to operate and an encryption key memory for storing a key for encrypting the local area communication wherein the encryption key corresponds to an encryption key stored in the local area server with which the network services device is authorized to operate.

As embodied as a system for providing personal internet based services, a presently preferred embodiment of the invention includes a local area server having at least one internet link connected to a link to at least one internet server and supporting a local area network and at least one personal device communicating with the local area server through the local area network. The local area server includes a processor and a memory for executing local area server programs, a local area server transceiver for providing wireless local area communications between the local area server and the at least one personal device, the local area communications including user inputs from the at least one personal device for directing internet communications functions and data received from the internet server to be provided to the at least one personal device, a modem connected to the internet link for user directed internet communications between the local area server and the at least one internet server, and a memory for storing local area programs including a transceiver control program for controlling the local area communications and at least one internet communications program for controlling communications between the local area server and the at least one internet server. The personal device, in turn, is tailored to provide the personal internet based services to a user of the personal device and includes a processor and a memory for executing personal device programs, a network services device transceiver for providing the wireless local area communications between the local area server and the at least one personal device, a memory for storing the personal device programs a device communications program for controlling operation of the local area device transceiver and at least one personal device program for controlling the personal device for performing the internet based service, an output device for providing the results of the internet based service to the user, and an input control device for user inputs for controlling operation of the personal device.

The present invention is also defined as a system for providing personal internet based services to a user within a restricted region defined by the coverage of a wireless local network. The system includes a local area server having an internet link to an internet server and including a local area server transceiver for providing wireless local area communications between the local area server and a personal device. The personal device is tailored to provide the personal internet based functions to a user of the personal device and includes a personal device transceiver for providing wireless local area communications between the personal device and the local area server. The local area communications include user inputs from the personal device for directing internet communication functions of the local area server and data received from the internet server to be provided to the personal device for use in providing the personal internet based functions to the user.

In its aspect of providing personal internet based services to a user within a restricted region defined by the coverage of a wireless local network, the system includes a local area server having an internet link to an internet server for performing internet communications functions and providing wireless local area communications between the local area server and a personal device and a personal device tailored to provide the personal internet based functions to a user of the personal device. In this embodiment, the local area communications include user inputs from the personal device for directing internet communication functions of the local area server and data received from the internet server to be provided to the personal device for use in providing the personal internet based functions to the user.

In a further aspect, the present invention is directed to a computer system capable of operating with the internet and including a local area server operatively connected to said internet for transmitting digital information to and receiving other digital information from the internet and a portable personal device capable of being hand-held by a user of the system. The portable personal device includes a means for wirelessly connecting to the local area server in a manner to transmit a representation of the digital information to the local area server and to receive a representation of the other digital information from the local area server. The local area server includes a means for converting the representation of the digital information into the digital information and for converting the other digital information into the representation of the other digital information, so that the user can communicate with the internet by using the hand-held, portable personal device within geographical limits imposed by transmission-constraints of the wirelessly connected means, while ambulatory, mobile or stationary.

The present invention may also be described as a computer system capable of operating with the internet and including a local area server connected to the internet for transmitting digital information to and receiving other digital information from the internet and a personal device that includes a means for wirelessly transmitting a representation of the digital information to the local area server and for wirelessly receiving a representation of the other digital information from the local area server.

DESCRIPTION OF THE DRAWINGS

The foregoing and other objects, features and advantages of the present invention will be apparent from the following description of the invention and embodiments thereof, as illustrated in the accompanying figures, wherein.

DESCRIPTION OF A PRESENTLY PREFERRED EMBODIMENT OF THE INVENTION

Figure 1:
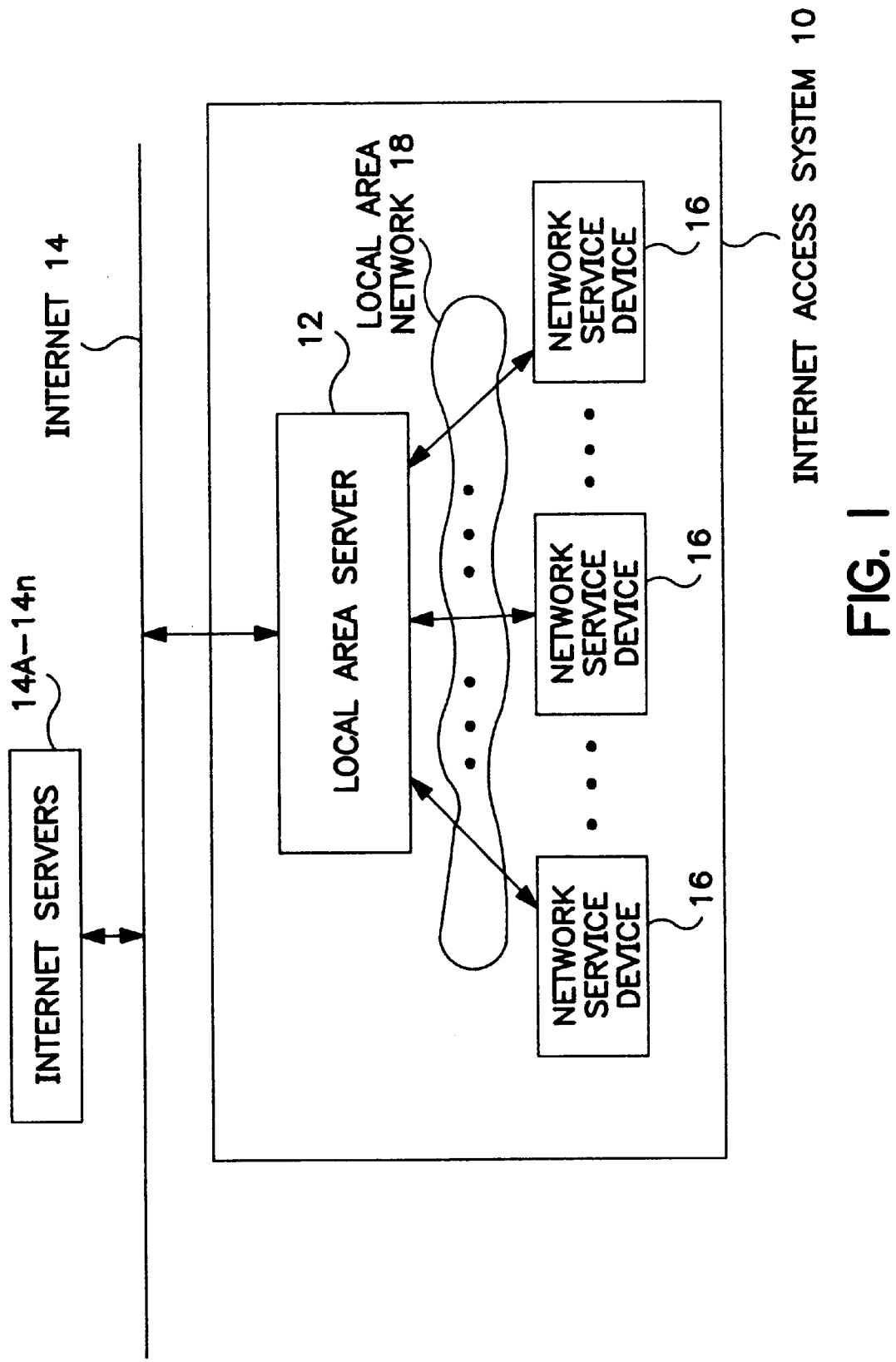
FIG. 1 is a diagrammatic representation of a personal internet access system for providing internet related services to a user of a personal device operating in the system.

Referring to FIG. 1, therein is shown a diagrammatic representation of a Network Access System 10 which, as illustrated, includes a Local Area Server 12 connected from a Network 14 and one or more Network Servers 14A through 14n connected to the Network 14 and one or more Network Service Devices 16 communicating with the Local Area Server 12 through a Local Area Network 18. In a presently preferred embodiment, Network 14 is the Internet and each Network Service Device 16 is tailored for a specific function or related set of functions, such as electronic mail and World Wide Web access or games or system monitoring and control functions and to the use of a particular user or restricted group of users or for a particular purpose. Each Local Area Server 12 serves a plurality of Network Service Devices 16 within a restricted but sufficiently extensive geographic area or locality defined by Local Area Network 18, such as a home or office, although Local Area Network 18 may, in certain embodiments, be extended to cover a larger geographic area, such as an office building, town or other such delineated area, in a manner similar to cellular telephones.

Figure 2:
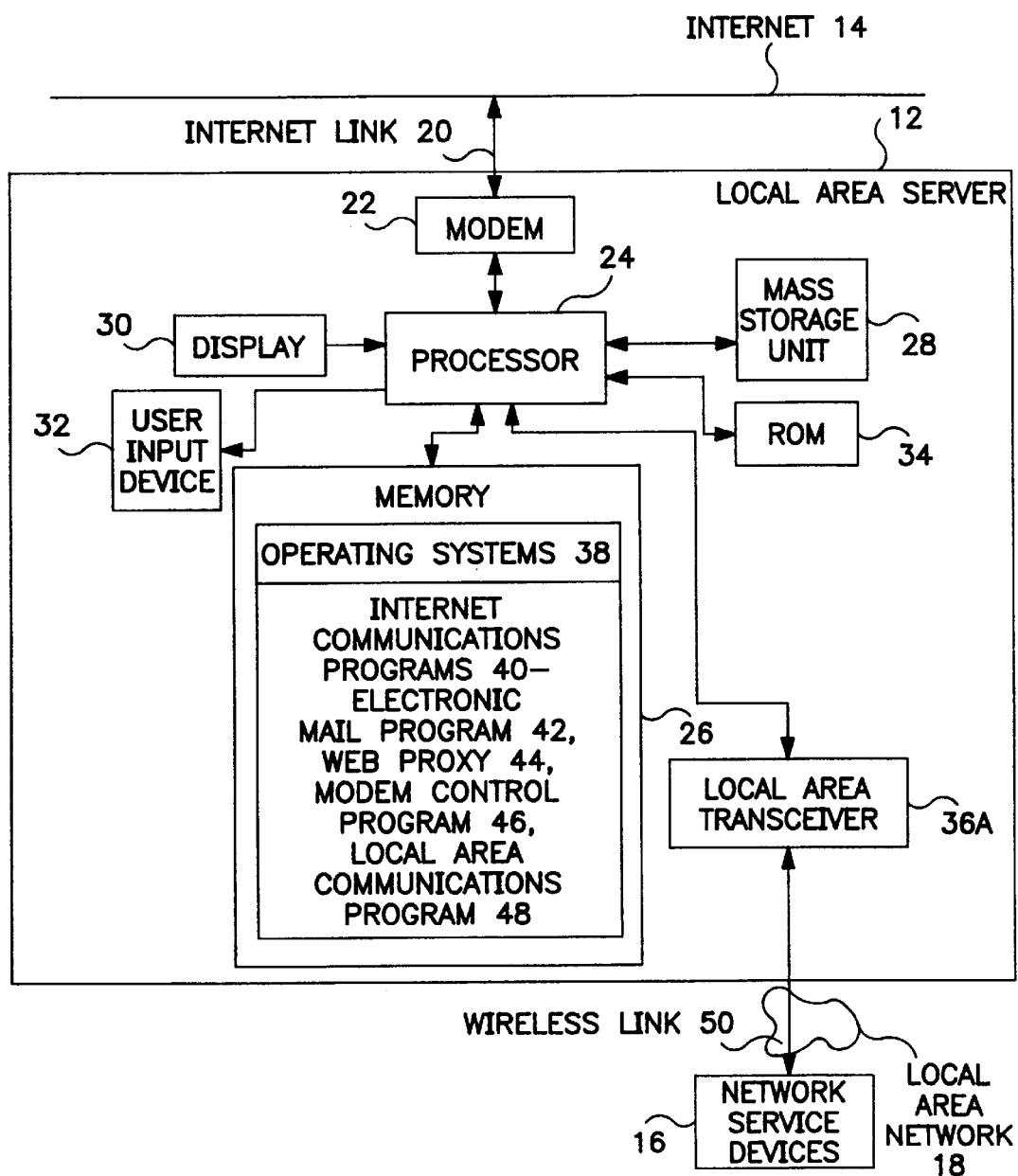
FIG. 2 is a block diagram of a local area server of the personal internet access system.

As represented in FIG. 2, the Local Area Server 12 is connected to the Network 14 through an Network Link 20, such as a telephone line connection to the Web or to another internet server. The connection to Network Link 20 is typically by means of a Modem 22 and Local Area Server 12 could typically be comprised of a general purpose computer, such as a personal computer. Local Area Server 12 would include a Processor 24 and Memory 26 for executing programs, and may include a Mass Storage Unit 28 for storing an operating system programs and applications programs, a Display 30, a User Input Device 32, such and a keyboard and mouse, and a Read Only Memory (ROM) 34 for storing boot programs, system configuration files, and so on. In other implementations, Local Area Server 12 may not include a Mass Storage Unit 28, for example, when Local Area Server 12 operating system and applications programs, such as Java programs or scripts, are downloaded from an Internet Server 14, or may not include a User Input Device 32 or Display 30, depending upon the intended purpose and use of the Local Area Server 12.

For purposes of the present invention, Local Area Server 12 would further include a Local Area Transceiver 36A and could include and execute an Operating System 38, Internet Communications Programs 40, such as an Electronic Mail Program 42, Web Proxy Program 44 and Modem Control Program 46, wherein Web Proxy Program 44 controls Local Area Server 12 to operate on Network 14 on behalf of an Network Service Device 16, and a Local Area Communications Program 48 controlling Local Area Transceiver 36A. In this regard, and for purposes of the present invention, Local Area Transceiver 36A is similar to the wireless link transceivers found in "cordless" telephones, but enhanced for data communication at normal internet data rates and transmission quality rather than the standards required for voice communication. Local Area Communications Program 48, in turn, controls the communication of data and user inputs between a Local Area Server 12 and one or more Network Service Devices 16 through Local Area Transceiver 36A and Wireless Links 50 which comprise Local Area Network 18. Local Area Communications Program 48 operates with, for example, a Web Proxy Program 44 to communicate data and user input between Network Service Devices 16 and the Internet Cmmunications Programs 40.

Local Area Server 12 may operate and be used as a personal computer, and may in fact be based upon a personal computer. As such, a Local Area Server 12 would thereby include the operating system and programs usual for such purposes, including applications programs, which would normally be stored in Mass Storage Unit 28. In alternate implementations, Local Area Server 12 could be implemented as a dedicated system specifically designed as a local area server for the system of the present invention and may be designed as a "utility" type device similar to a "cable box" wherein the local user of the services does not have access to or operational control of the device. In this embodiment, Local Area Server 12 may not include a Display 30, User Input Device 32 or Mass Storage Unit 28 and all of the programs may reside in a ROM 34. Also, and as described above, Local Area Server 12 operating system and applications programs may be downloaded from an Internet Server 14, for example, in the form of Java programs or scripts.

Therefore, and as described generally above, Local Area Server 12 will execute the functions and operations of the Operating System 36 and the Internet Communications Programs 40 in Memory 26 and Processor 24 to perform the usual electronic mail and web access functions through Modem 22 and Network Link 20 and Local Area Server 12 will function as a proxy on Network 14 for external devices such as Network Service Devices 16. For example, Local Area Server 18 may concurrently execute Local Area Communications Program 48 in Memory 26 and Processor 24, which will interoperate cooperatively with, for example, an Electronic Mail Program 42 and Web Proxy Program 44 to control Local Area Transceiver 36A to communicate with one or more Network Service Devices 16 through one or more Wireless Links 50 of Local Area Network 18.

Figure 3:
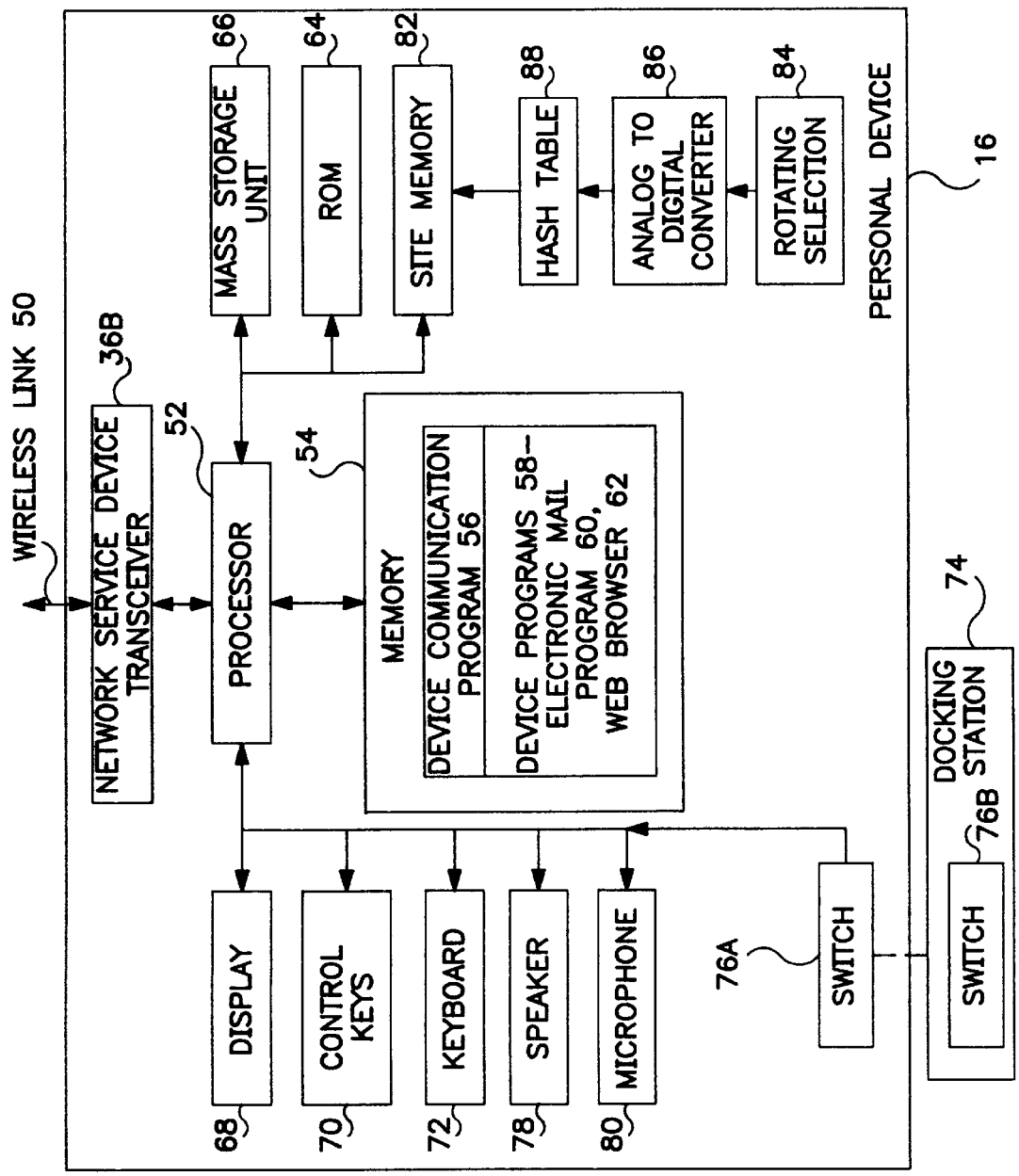
FIG. 3 is a block diagram of a personal device of the personal internet access system.

As represented in FIG. 3, a Network Service Device 16 will include a Network Services Device Transceiver 36B similar to Local Area Transceiver 36A and a Processor 52 with Memory 54 for executing a Device Communications Program 56 for communicating with Local Area Server 12 through a Wireless Link 50 of Local Area Network 18 and one or more Device Programs 58 for controlling the desired functions of the Network Service Device 16. Device Communications Program 56 will execute in Processor 52 and Memory 54 to control the communication of data and user inputs between the Network Service Device 16 and a Local Area Server 18 through a Wireless Link 50, and will operate with Device Programs 58, which may include, for example, an Electronic Mail Program 60 or a Web Browser 62, to communicate data and user input between the Local Area Server 18 and the Device Programs 58. Device Communications Program 56 and Device Programs 58 may be stored in a Read Only Memory (ROM) 64 or, in certain instances, in a Mass Storage Unit 66. A Network Service Device 16 will also generally include a Display 68, and may include Control Keys 70 or a Keyboard 72, depending upon the particular purpose and functions of a given Network Service Device 16.

According to the present invention, a Network Service Device 16 may be a general purpose electronic mail and internet communication device, such as a notebook computer communicating with the internet through Local Area Server 18. In such embodiments, the majority of the functional components of a Network Service Device 16 may be provided by the components typically found in a personal computer, with the addition of a Network Services Device Transceiver 36B, a Device Communications Program 56 and one or more Device Programs 58.

In other embodiments, a Network Service Device 16 may be a dedicated, specific purpose device tailored for a particular function or use or limited range of functions or uses and, in such embodiments, the components of the Network Service Device 16 will generally be designed and constructed for the specific functions of the Network Service Device 16.

For example, a typical Network Service Device 16 could be constructed specifically as a portable web browser and electronic mail device. In this embodiment, the Personal Device 14 will include a Display 68, such as a super-twist color liquid crystal display (LCD), that may be constructed as a touch screen for the direct "point and click" control of a web browsing or electronic mail program in a manner compatible with current popular user programs. The device may also include a set of Control Keys 70 specifically selected for controlling the web browsing or electronic mail functions, and will probably include a Keyboard 72 for text entry to a web browsing or electronic mail program. The Keyboard 72 may be implemented in a number of ways, such as a fold-out or slide-out keyboard similar to those found in "pocket diaries" and calculators or as a graphic display on the touch screen display, although an on screen keyboard does reduce the display area of the screen. Alternately, or in addition, the device may be provided with a separate touch pad controller, for example, as part of Control Keys 70 or Keyboard 72.

Further in this regard, a Network Service Device 16 may be provided with a Docking Station 74 having power contacts for recharging the power supply batteries in the device. The Docking Station 84 could be implemented as part of Local Area Server 18 and the removal of the Network Service Device 16 from Docking Station 74 would, for example, activate a Switches 76A and 76B in the Network Service Device 16 and in the Docking Station 74 to turn on the Network Service Device 16 and initiate Local Area Server 18 to activate a Wireless Link 50 to the Network Service Device 16. Alternately, the Docking Station 74 could be physically separate from but connected to Local Area Server 18, or both physically and electrically separate from Local Area Server 18. In the latter instance, or if the Network Service Device 16 were recharged by a charger associated with the Network Service Device 16, for example, in the manner of a laptop computer, a Wireless Link 50 between the Network Service Device 16 and the Local Area Server 18 and communication between the units could be initiated by a signal transmitted from the Network Service Device 16 and detected by the Local Area Server 18. In this case, the Switch 76A in Network Service Device 16 could be implemented, for example, as an on-off switch, as internal "touch any key" logic operating from standby power, or as a motion or position sensing switch.

Other functions may be readily added to such a Personal Device 14. For example, the device may also include a Speaker 78 for sound, and perhaps a Microphone 80 so that the device could be used as a cordless telephone. Further in this respect, the addition of a an appropriate Device Program 58, such as a basic word or text processing program or a notes type program together with an alphanumeric keyboard, would allow the Network Service Device 16 to be used as a "message board" by a number of users, such as the members of a family. The addition of a calendar program would allow the device to serve as a general calendar for the users, for example, to post doctor's appointments and so on.

In yet a further application, some homes and offices are now environmentally controlled by computer systems and, if an environmental control system were connected from Local Area Server 18 or provided with an internet connection, a Network Service Device 16 as described above could be used to control a local or remotely located home or office environmental system. Yet other Network Service Devices 16 may be constructed as home or office security or fire detection devices and connected through a Local Area Server 18 to provide security or fire indications to a Network Service Device 16 as described above, either directly or through the internet, or through the internet to a remote monitoring service. In such instances, the Network Service Devices 16 may not be provided with the user input and display devices used in Network Service Devices 16 intended for use by human users, unless required for setup and control of the devices, and may be connected directly to the sensors or systems that are to be monitored or controlled through Network 14.

Still further Network Service Devices 16 may be constructed for other specialized needs or interests. For example, a Network Service Device 16 with suitably ruggedized components including audio capability and a display screen could be built into a child's toy, such as a Teddy Bear. The device would preferably include an appropriate set of special purpose Control Keys 70 selected for the intended play functions, such as selection and playing of stories, music and games, which would be downloaded from a remote internet server or from the Local Area Server 12. A similar Network Service Device 16 with specialized control keys could also be provided for adult level games, such as chess and various card games, and both the adult and children's Network Service Devices 16 could be interactive through the internet with other users.

Yet another type of Network Service Device 16 would be specialized for "chat room" operation wherein the device would sit, for example, on a table in the manner of a radio but would monitor a selected "chat room" and would include a text to speech converter for audio playout of newly entered comments by other users. The device could include a microphone and speech to text converter to allow the local user to enter the user's own comments, or could incorporate a keyboard and dedicated purpose control keys to allow the local user to type in their comments.

It should be noted that many of the Network Service Devices 16 described above would be essentially intended for users who are not technically oriented or knowledgeable for various reasons, such as age or lack of interest in learning the technology necessary to use more general purpose systems, such as laptop computers. As described above, it is intended that Network Service Devices 16 for such users include displays, audio outputs and dedicated function control keys tailored to specific, dedicated functions in the manner of more common appliances, such as televisions, radios and CD players. For example, and as illustrated in FIG. 3, such a Network Service Device 16 may be provided with a Site Memory for storing the internet addresses of pre-selected internet sites, including other Local Area Servers 18. An up/down "channel select" Control Key 70 would then allow the user to step through the pre-selected sites to select the particular site desired at a given time. Alternately, a Rotating Selector 84, such as a potentiometer, with an Analog to Digital Converter 86 and possibly a Hashing Table 88 would perform the same function, but in an analog manner similar to the tuning dial on a radio, by converting a mechanically analog input into a digital address of a site address in Site Memory 82. It should be noted, in this regard, that the use of a Site Memory 82 loaded with pre-selected site addresses would be particularly advantageous in Network Service Devices 16 for use by children in limiting the children's choice of sites to those selected and approved by the responsible adults.

While it has been described above that each Network Service Device 16 may be primarily intended for use within the confines of a chosen Local Area Network 12, such as a particular home or office, certain users may wish to use their Network Service Device 16 outside the "home" Local Area Network 12. For example, a business person may wish to carry a Network Service Device 16 between home and their office and to use the Personal Device 14 within both locations or even to use their Network Service Device 16 between the locations. For example, a user may wish to use their Network Service Device 16 at home to retrieve information from their office, or may wish to use their Network Service Device 16 at the office to control functions within their home, such as turning on or off lights and heat, starting the stove for dinner, leaving a message on the message board Network Service Device 16 at home, and so on. Also, while many Local Area Networks 12 will have restricted areas of coverage, such as within a single home, others may have much wider areas of coverage, in the manner of cellular telephone services. It is therefore possible that there may be interference and "leakage" between Local Area Networks 12, even between very restricted networks if they are closely located, such as in an apartment or condominium complex.

Therefore, given the possibility of use of Network Service Devices 16 between Local Area Networks 12 and the possibility for interference or "leakage" between Local Area Networks 12, it is desirable for Local Area Servers 18 and Network Service Devices 16 to include provisions for privacy and security, at least in selected instances.

For example, mutual interference between Local Area Networks 12 may be largely avoided by providing Local Area Transceiver 36A and Network Services Device Transceiver 36B with a plurality of selectable transmitting and receiving channels or frequencies, the frequency or channel of a given Local Area Server 12 and its associated Network Service Devices 16 being selected either at manufacture or during installation or programatically, that is, by automatic, program controlled self selection of frequencies or channels as is provided in certain cordless telephones. In this regard, it may be desirable that at least certain of the Network Service Devices 16, such as those intended primarily for use by professional users who may wish to operate their devices in a plurality of Local Area Networks 12, be provided with the capability of operating on any of a plurality channels or frequencies, with the current operating channel or frequency being selectable by the user.

Security and privacy from unauthorized intrusion, in turn, may be provided by means of passwords and codes. For example, each Network Service Device 16 may be provided with an individual security code, either at time of manufacture or when it is installed in a Local Area Network 12, with the security code installed, for example, in its ROM 64. The security code of a Network Service Device 16 may then be installed in the Local Area Server 18 of any Local Area Network 12 in which it is authorized to operated, again, for example, in the ROM 34 of the Local Area Server 18, whereby a given Local Area Server 18 will recognize and respond only to those Network Service Devices 16 authorized to operate in its network. Security may be further enhanced by the use of user selectable and entered personal passwords, so that a Network Service Device 16 will respond to user input only when the user has entered the correct password. In alternate implementations, or at least in certain Network Service Devices 16, physical interlocks, such as keys or magnetic keycards, may be used to prevent unauthorized use of the Network Service Devices 16.

Finally, privacy and security may be enhanced may the use of encryption wherein, for example, Local Area Servers 18 are provided with an encryption program or device with each Local Area Server 18 so provided being assigned a corresponding individual encryption key. Each Network Service Device 16 authorized to operate in an encrypted Local Area Network 12 would also be provided with an encryption device or program, and a corresponding encryption key for that Local Area Server 18 would be installed in the Local Area Server 18 when it was authorized for the network. It should be noted that a lower level of privacy that would be adequate for many applications may provided in a similar manner by the use of relatively simple encryption programs or devices and the assignment of encryption keys selected from a limited family or set of encryption keys to the Local Area Servers 18 and the Network Service Devices 16 in a manner similar to the assignment of transmitting/receiving channels or frequencies.

Finally, it is preferred that Local Area Servers 18 and Network Service Devices 16 be constructed from commercially available components to the extent possible. For example, components that may be used in Local Area Servers 18 could typically include an AMD Elan SC400 microcontroller for Processor 24, a PCMIA modem for Modem 22, a PCMCIA Wireless LAN card for Local Area Transceiver 36A, a 2.5 inch disk drive for Mass Storage Unit 28 and 8 Megabytes of memory for Memory 26. In a similar manner, a Network Service Devices 16 could typically include a Digital StrongARM 1100 microcontroller for Processor 52, a PCMCIA Wireless LAN card from Netwave for Network Services Device Transceiver 36B, 4 Megabytes of flash memory for ROM 64, 8 Megabytes of memory for Memory 54, a 7.5 inch LCD panel and a touchscreen digitizer, both as available from Sharp. Other components that may be used for these purposes will be readily apparent to those of ordinary skill in the relevant arts, as will the additional minor components comprising these devices, such as batteries and so on.

In conclusion, while the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. A system for providing personal internet services to a user of a personal internet device, wherein the system includes a local area server and a personal internet device, the local area server including a modem connected to the internet for performing user directed internet communication operations between the local area server and a remote internet server, a local area server transceiver for providing wireless local area communication of personal internet device data between the local area server over a wireless local area network region and the at least one personal device, and a memory and a processor for storing and executing local area server programs, comprising:

in the local area server, local area server programs including a transceiver control program for controlling the wireless local area communication of personal internet device data between the local area server and the personal internet device, wherein the personal internet device data includes user inputs transmitted from the personal internet device to the local area server and requesting internet communication operations to be performed for the user of the personal internet device, and results of internet communication operations requested by the user transmitted from the local area server to the personal internet device, and at least one internet communications program for controlling internet communication operations between the local area server and the remote internet server, and the personal internet device wherein the personal internet device is tailored to provide the personal internet services to the user of the personal internet device and includes a memory and a processor for storing and executing personal internet device programs, a personal internet device transceiver for providing the wireless local area communication of the personal internet device data between the local area server and the personal internet device, an output device for providing the results of the internet communication operations to the user, and an input control device for accepting the user inputs requesting internet communication operations to be performed for the user of the personal internet device, wherein the input device and the output device are tailored for the personal internet services to be provided to the user of the personal internet device, and the personal device programs, including a device communications program for controlling the wireless local area communication of the personal internet device data between the local area server and the personal internet device, and at least one personal device program for controlling operation of the personal internet device for providing the results of the internet communication operations to the user and accepting and transmitting to the local area server the user inputs requesting internet communication operations to be performed for the user of the personal internet device, wherein the wireless local area network region is restricted to a limited geographic area, the local area server transceiver and the personal internet device transceiver are each adapted to communicate the personal internet device data at internet data transfer rates, and the local area server programs include a proxy program responsive to user inputs transmitted from the personal internet device for directing the operation of the local area server in executing internet communications operations requested by the user of the personal internet device, wherein the internet communication operations are executed by the local area server on behalf of the personal internet devices.

2. The system for providing personal internet services of claim 1 wherein the output device of the personal internet device comprises a liquid crystal display.

3. The system for providing personal internet services of claim 1 wherein the output device of the personal internet device comprises an audio output device.

4. The system for providing personal internet services of claim 1 wherein the input device of the personal internet device comprises a keyboard.

5. The system for providing personal internet services of claim 1 wherein the input device of the personal internet device comprises a set of dedicated control keys tailored specifically to the internet services to be provided to the user of the personal internet device by the personal internet device.

6. The system for providing personal internet services of claim 1 wherein:

the input and output devices of the personal internet device are a touch screen liquid crystal display.

7. The system for providing personal internet services of claim 1, wherein input device of the personal internet device further comprises:

an internet address memory for storing a pre-selected set of addresses of network servers, and a control input for selecting a one of the pre-selected set of addresses of network servers.

8. The system for providing personal internet services of claim 7 wherein the control input for selecting a one of the pre-selected set of addresses of network servers further comprises:

a mechanically analog device for generating an analog voltage representing a pre-selected address of an internet server, and an analog to digital code converter for converting the analog voltage representing a pre-selected address of an internet server into an address of a pre-selected address of an internet server in the internet address memory.

9. The system for providing personal internet services of claim 1, wherein the personal internet device transceiver further comprises:

an encryption device for encrypting the wireless local area communication between the personal internet device and a local area server with which the personal internet device is authorized to operate, and an encryption key memory for storing a key for encrypting the wireless local area communication wherein the encryption key corresponds to an encryption key stored in the local area server with which the personal internet device is authorized to operate.

* * * * *